United States Patent [19]

Salkeld et al.

[11] 4,318,517

[45] Mar. 9, 1982

[54] CLOSED SPACE STRUCTURES

[76] Inventors: Robert J. Salkeld, 266 Blood's Ridge Rd., Bear Valley, Calif. 95223; Ralph C. Sklarew, 963 Dunlin, Westlake Village, Calif. 91366

[21] Appl. No.: 65,335

[22] Filed: Aug. 9, 1979

Related U.S. Application Data

[63] Continuation of Ser. No. 817,150, Jul. 20, 1977, abandoned.

[51] Int. Cl.³ .............................................. B64G 1/10
[52] U.S. Cl. ............................................... 244/158 R
[58] Field of Search ............................... 244/158–163, 244/172–173; D12/71–72; 325/4, 16, 115; 322/2 R; 343/DIG. 2; 331/DIG. 1

[56] References Cited

U.S. PATENT DOCUMENTS

| | | | |
|---|---|---|---|
| 3,144,219 | 8/1964 | Schnitzer | 244/159 |
| 3,332,640 | 7/1967 | Nesheim | D12/72 X |
| 3,478,986 | 11/1969 | Fogarty | 244/159 |
| 3,532,298 | 10/1970 | Swef | 244/167 |
| 3,564,253 | 2/1971 | Buckingham | 244/164 |
| 3,781,647 | 12/1973 | Glaser | 244/159 |

OTHER PUBLICATIONS

Stampfl, "Relay Satellite Systems", 1970 IEEE Inter. Convention (New York), pp. 30–31, Mar. 23–26, 1970.
Larry Niven, "Ringworld", 1975, Cover and pp. 110, 111, 117, 130.
NASA Facts, "Explorer XIX", 1964.

*Primary Examiner*—Galen L. Barefoot

[57] ABSTRACT

The invented space structure is elongated and closed upon itself in the form of a ring or belt. In the preferred form it encircles a gravitational body and rotates at or above orbital velocity, while in an alternate form it does not encircle any gravitational body. Said space structure for attaching, among other things, equipment such as sensors, communication devices, energy collectors and transmitters.

18 Claims, 10 Drawing Figures

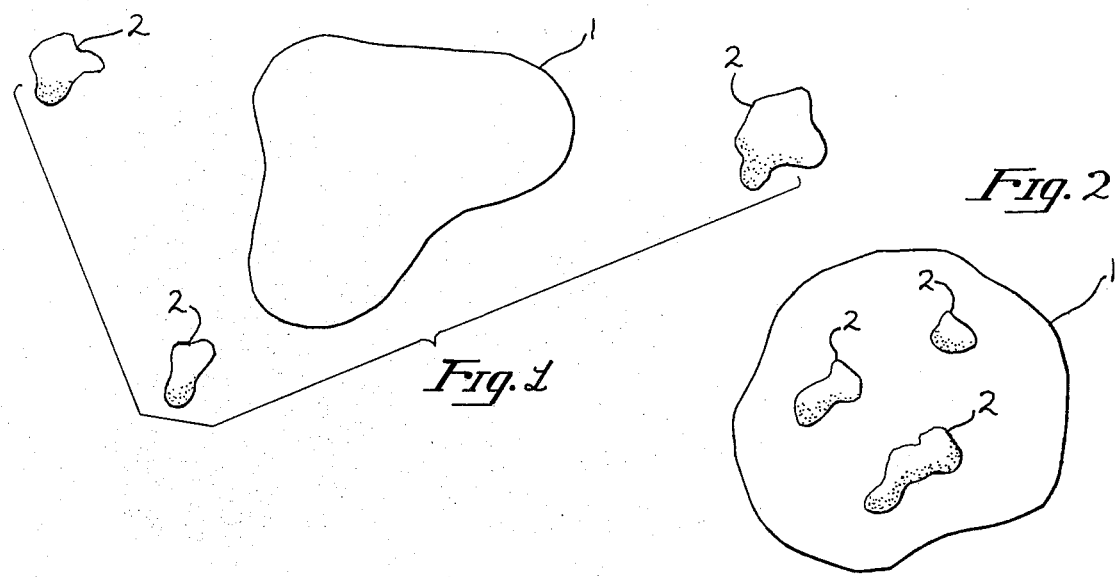
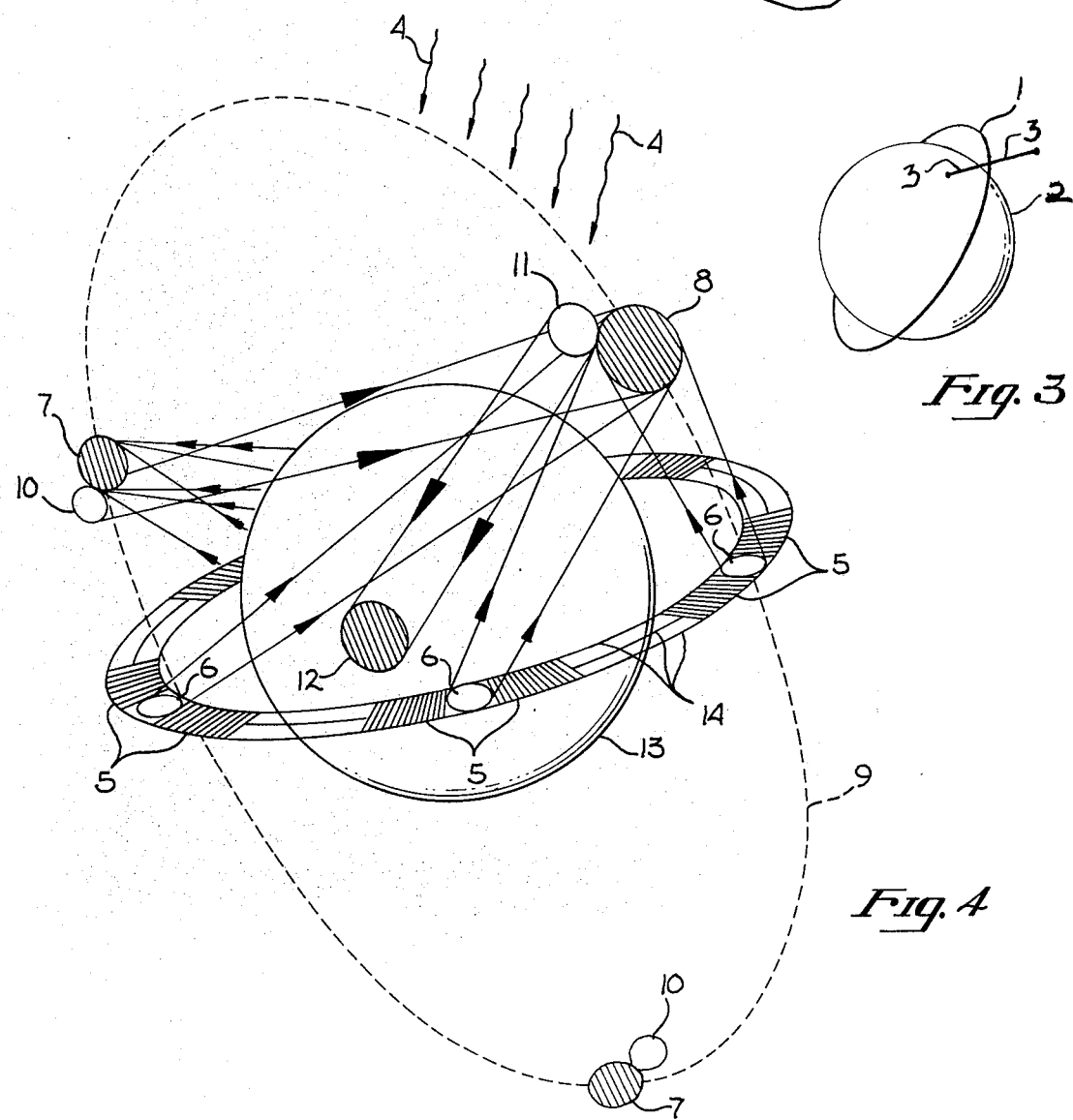

CLOSED SPACE STRUCTURES

This is a continuation, of application Ser. No. 817,150, filed July 20, 1977, now abandoned.

BACKGROUND OF THE INVENTION

1. Field of the Invention

The present invention relates to structures in space and in particular to novel configurations for obtaining improved performance and new capabilities for systems utilizing large space structures.

2. Prior Art

The present invention is a totally unique structure. There is no prior art. The invented device provides structure not known or contemplated.

There does exist and has existed since the 1920's a proposal to construct space stations in the form of a wagon wheel. In these proposals the perimeter rim comprises the housing. The hub is used for docking, and the spokes help maintain structural integrity as the wheel is rotated. The rotating produces centrifugal force or an artificial gravity system. The invented structure is a space structure rotating in orbit to which various equipment and modules may be attached and maintained in a particular relationship to the gravitational bodies about which it is disposed. In the preferred form the structure may be used as a space solar power system while also being used to attach many other objects.

There does exist concepts relating to space solar power systems. The primary one being the fabrication of a single or series of huge solar panels. The panels are placed in geosynchronous orbit and are designed to be attitude controlled so that they always face the sun. The problem with these space solar power systems is that they must be placed and maintained in geosynchronous orbit. The transportation costs of getting objects to that orbit is very great as compared with low earth orbit. Also geosynchronous orbit is becoming cluttered since it is the most desirable orbit for communication and various devices. However, once in geosynchronous orbit the object must be maintained therein or they will drift. Huge space stations like the one proposed require large amounts of energy to maintain their orbit and fuel must be constantly supplied to drive the stabilizing means.

The present invention solves these problems by providing a maintenance free structure in space which will maintain its orbit and position at all times. The structure may be used for space solar power systems as well as for communication networks, docking places and to attach any and all other types of equipment.

SUMMARY OF THE INVENTION

A space structure elongated and closed upon itself in the form of a ring or belt having no wheel-like spokes or central hub is disclosed. In one embodiment this structure entirely encircles a gravitational body while moving at or above the natural orbital velocity thereby providing a passively-stabilized platform for a variety of equipments such as sensors, communication devices and energy collectors and transmitters. In the preferred form, the structure comprises a set of close-spaced parallel cables in sun-synchronous earth orbit beneath the Van Allen radiation belts. Many independent solar energy collector-transmitter modules are coupled to the cable to collect and beam solar energy to relay recten- na-transmitter units in geosynchronous orbit, which in turn beam the energy to a receiving field on earth. Other advantages of the invented space system are: that about ninety percent of the total power system weight is in low rather than geosynchronous orbit; and in a configuration which promises to be self-stabilized; and whether encircling a gravitational body or not, this structure can serve as a transmitter or receiver for very long wavelength communication systems.

An object of the present invention is to provide a closed ring-like or belt-like structure to which a variety of useful equipment may be attached.

Another object of the present invention is to provide closed continuous structures circumorbital about gravicentric bodies or sets of bodies, as well as structures not enclosing sources of gravitational force.

Another object of the present invention is to provide a space structure which is passively stabilized and minimizes or eliminates the need for active stabilization means.

A further object of the present invention is to provide structural means and techniques for improved space solar power systems.

Another object of the invention is to provide a structure which will enlarge the radius of the geosynchronous orbit of a gravitational body.

Another object of the invention is to provide a stabilized structure in low earth orbit which will reflect solar energy from point to point on said structure for collection and transmission to the earth.

A further object of the present invention is to provide structural means and techniques for improved reception and transmission of very long wavelength electromagnetic signals.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

BRIEF DESCRIPTION OF THE DRAWINGS

FIG. 1 illustrates in schematic form the Closed Space Structure not enclosing sources of gravitational force;

FIG. 2 illustrates in schematic form the Closed Space Structure enclosing a set of distinct and different sources of gravitational force;

FIG. 3 illustrates in schematic form the Closed Space Structure enclosing a set of sources of gravitation force collected together in a single body, such as the earth, which acts as a single source of gravitational force;

FIG. 4 illustrates the use of the present invention to provide an improved space solar power system;

DETAILED DESCRIPTION OF THE PRESENT INVENTION

Figure 5:
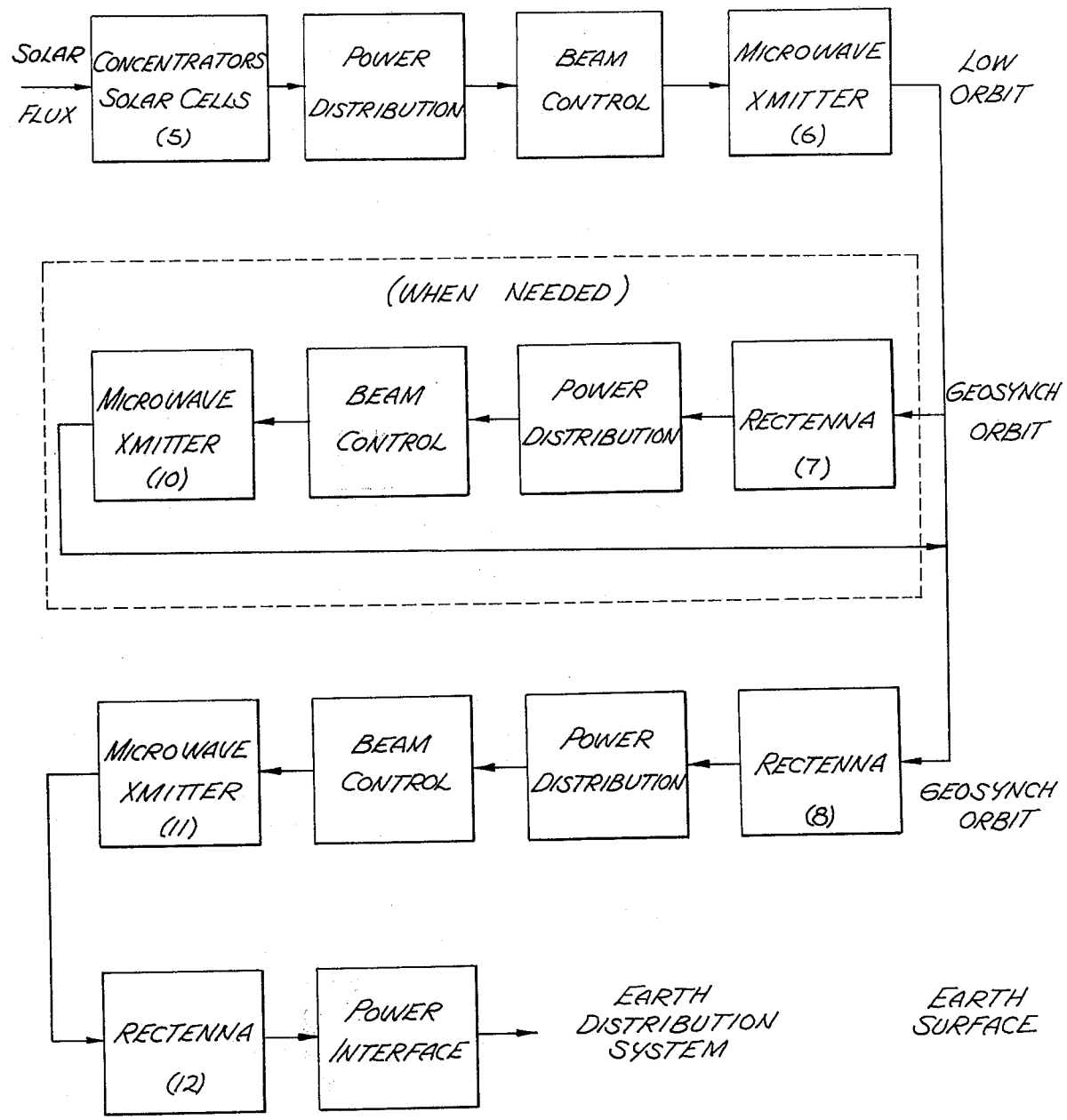
FIG. 5 is a block diagram describing a typical energy handling chain from solar flux through delivery to a power network on earth.

In FIGS. 1-3 the configuration of the Closed Space Structure 1 may be to some degree a matter of choice, but in general will be influenced by the gravitational forces of other bodies 2, and by the forces of its own motion, if any. For example, in FIG. 3 the structure 1 is disposed around a spherical globe or gravitational body 2 and hence the configuration will generally approximate a circle or an ellipse. If a circle, then its rotation rate may be the same as that associated with the orbital velocity at that distance, in which case the structure 1 is in neither tension nor compression since at the orbital velocity the centrifugal force exactly balances the gravitational pull. Alternatively it may rotate at a different rate than the natural orbital velocity. If slower, then it will be in compression; if faster, then it will be in tension. The possibility of slower or faster rotational speeds will, of course, depend on the strength of materials involved and the type of construction (e.g. cable, I-beam, truss, etc.).

The structure 1 provides advantages and new capabilities not known in present space structures. A major such advantage is that it can extend any particular orbit. For example, geosynchronous earth orbit can be extended by placing the structure slightly beyond that orbit or by attaching equipment thereto. The extension results due to the structures of rotation, or by rigid or semi-rigid extensions 3 of itself in the radial direction. It also provides a basis for orbiting various equipments at rates different from the natural orbital velocities. In a sense, it might be said that this is a way of "fooling nature". If the space structure 1 is in tension it is passively stabilized and needs little or no active attitude control or station-keeping mechanism. If the space structure is in or near geosynchronous equatorial orbit, that is, if it is rotating at the same rate as the earth's surface, any antennas or transmitters that may be attached to it need not be movable and station kept.

An improved space solar power system concept, in which all solar energy collection systems are passively stabilized in low altitude orbit, is shown (not to scale) in FIG. 4 of the preferred embodiment. Radiant solar energy or flux 4 falls on photovoltaic panels 5 where it is converted to electrical energy feeding phased-array microwave transmitters 6 which beam the energy to rectennas 7 and 8 in geosynchronous equatorial orbit 9. Rectennas 7 and 8 feed phased-array microwave transmitters 10 and 11 and transmitter 11 beams the total collected energy to a rectenna field 12 on earth 13. In cases where rectenna-transmitter 8 and 11 is hidden from one or more microwave transmitters 6 by the earth, then the energy from those microwave transmitters 6 is relayed to rectenna-transmitter 8 or 11 by a rectenna-transmitter 7 or 10 as illustrated.

In the preferred form of a space solar power system the space structure is formed from cables 14 (FIG. 4). The solar panel-transmitter modules 5 and 6 are mounted on cables 14 which encircle the earth in accordance with the principle of the present invention. Orbital altitude is selected high enough to provide reduced earth-shadowing and atmospheric drag, yet low enough to avoid unacceptable radiations to the solar cells in the lower regions of the Van Allen radiation belts. Orbital inclination is selected such that the nodal precession rate exactly equals the earth's revolution rate about the Sun, to maximize solar illumination and energy collection. This is called a "sun-synchronous" orbit. The space structure 14 having multiple panels 5 and 6 may be spun up to rotate slightly more rapidly than natural orbital velocity for that altitude, creating a condition of gentle tension within cables 14 and thus a tendency to self-stabilize. The cables 14 are spaced sufficiently apart to eliminate as nearly as possible the breaking of more than one cable at a time by accidental collision with space equipment or debris in other orbits, and are designed such that in case of a collision the cables remaining intact can support the loads of the entire low-orbital portion of the system. A typical energy handling chain from solar-flux to an earth distribution system is shown by block diagram in FIG. 5.

This space solar power system concept offers distinct advantages over previously proposed concepts:

1. It permits most of the system weight (probably over 90 percent) to be in low-orbit (less than 1000 km altitude). Most space solar power systems concepts previously proposed require the entire solar system to be in geosynchronous orbits which impose much higher lift costs or establishment of lunar mining operation if the systems are to be fabricated from lunar materials.

2. The low-orbit structure 14 of the system promises to be self-stabilizing, thus greatly reducing the need for complex stabilization components and expendable reaction fluids, which is extensive for active systems.

3. Composing the system of many small independent collection-transmission modules 5 and 6, perhaps thousands, permits ready demonstration of final modules themselves in a pilot mode, thus reducing development cost and risk.

4. The modularity of the system permits ready growth to very large total capacities, by adding more modules 5 and 6 to the structure 14 and by adding more cables. Also, new modules can take progressive advantage of evolving technologies.

Figure 6:
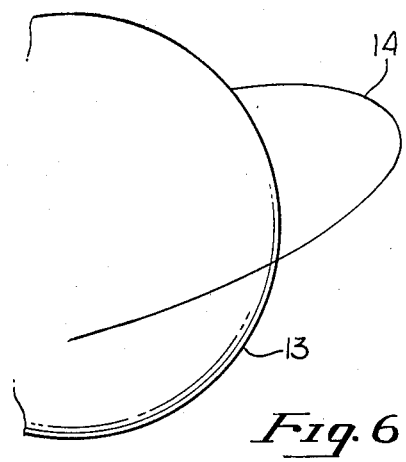
FIG. 6 illustrates the first step in construction of the preferred form of the present invention.
Figure 7:
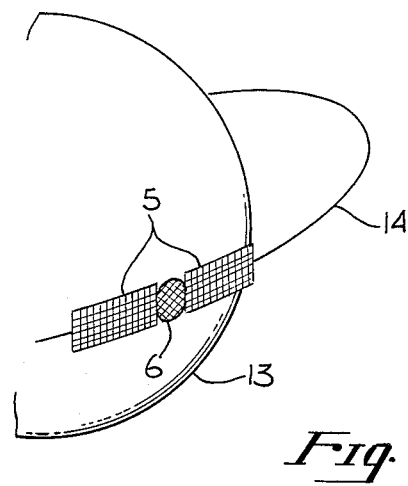
FIG. 7 illustrates the second step in construction of the preferred form of the present invention.
Figure 9:
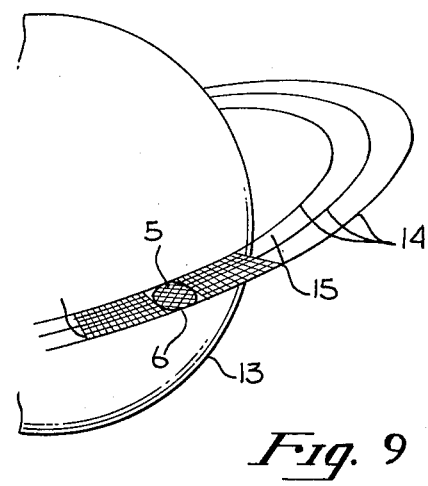
FIG. 9 illustrates the fourth step in construction of the preferred form of the present invention.
Figure 8:
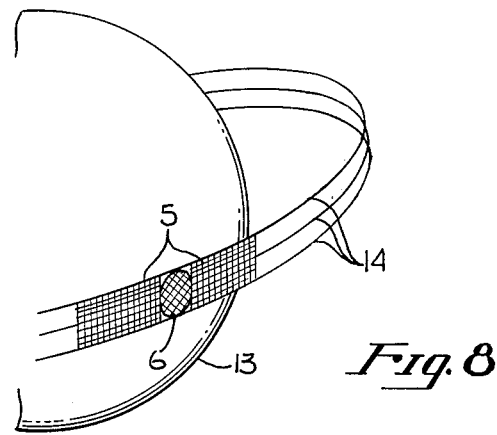
FIG. 8 illustrates the third step in construction of the preferred form of the present invention.

FIGS. 6-9 show in terms of a single collector-transmitter module 5 and 6 a possible construction sequence for the low-orbit structure 14 of the low orbit space solar power system. First, a basic anchor cable 14 in accordance with this invention is placed in orbit about the earth at orbital velocity, as shown in FIG. 6. Second, a collector-transmitter module 5 and 6 is assembled and anchored to the cable, as shown in FIG. 7. Third, when all modules are completed and anchored, second and third cables 14 are orbited and attached to link the outer edges of the modules 5 and 6 as shown in FIG. 8. Finally, the entire assembly is rotated 90 degrees into the orbital plane as shown by the rotation arrows 15 in FIG. 9. In an alternate embodiment the structure could be formed with cables 14 in their final position (FIG. 9) and the cables 14 could be placed prior to assembly of the modules 5 and 6.

Figure 10:
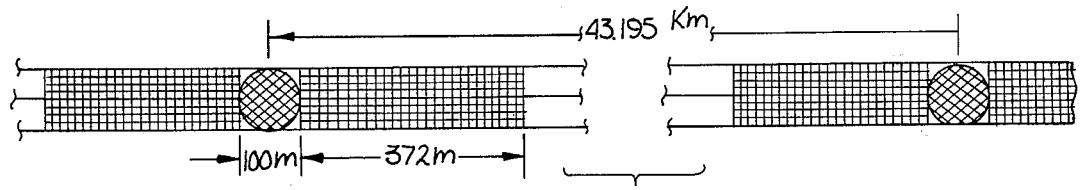
FIG. 10 illustrates the size and spacing of the solar panels and microwave transmitters of the preferred form of the present invention.

FIGS. 1-9 are schematic only. To convey an idea of the possible configuration of a typical module, FIG. 10 shows to scale the dimensions and spacing of a preferred form of a typical module belonging to a system having the following gross specifications: (1) rectified ground power output—10,000 megawatts; (2) number of modules—1000; orbital altitude—500 km; (3) number of cables—3; spacing between cables—50 m.

In addition to serving as a mooring or support structure for various equipments, the present invention could also act as a very large aperture antenna for transmitting and receiving very long wavelength communications, as with submerged nuclear submarines, or as in investigating extraterrestrial signals.

While particular embodiments of the present invention have been shown and described, it will be obvious to one skilled in the art that changes and modifications may be made without departing from the invention in its broader aspects and, therefore, the aim in the appended claims is to cover all such changes and modifications as fall within the true spirit and scope of this invention.

I claim:

1. A non-rigid enclosed space structure elongated and closed upon itself in the form of a loop or belt, rotating in space in an orbit where the centrifugal forces are substantially counter-balanced by the gravitational forces, said space structure capable of conforming and adjusting to all forces of its own motion and all forces of other bodies.

2. A space structure as set forth in claim 1, which entirely encircles one or more naturally formed masses such as asteroids or large astronomical bodies.

3. A space structure as set forth in claim 1, which is essentially circular in planform and rotates exactly at the rate necessary for maintenance of a circular orbit at its distance from the gravitational source.

4. A space structure as set forth in claim 2 where it's rotational speed causes said structure to be in self stabilizing tension in that the centrifugal forces are slightly greater than the gravitational forces.

5. A structure as set forth in claim 2, having extensions of itself in the radial direction, for extending said orbit and for attaching thereto various equipment and objects.

6. The structure as set forth in claim 2 to which equipment for transmission, reception and generation of energy and information can be coupled and secured in position thereto.

7. A structure in space, elongated and closed upon itself in the form of a loop or belt, encircling one or more naturally formed masses, other than a stellar body, such as Asteroids or large astronomical bodies, and rotating in space in an orbit where the centrifugal forces are substantially counter-balanced by the gravitational forces.

8. The structure of claim 7, wherein said large astronomical body is the earth.

9. The structure of claim 8, disposed in low earth orbit and rotating at or near the rate necessary to maintain said orbit.

10. A space structure as set forth in claim 7 Where its rotational speed causes said structure to be in self-stabilizing tension in that the centrifugal forces are slightly greater than the gravitational forces.

11. A structure as set forth in claim 7, having extensions of itself in the radial direction, for extending said orbit and for attaching thereto various equipment and objects.

12. The structure as set forth in claim 7 to which equipment for transmission, reception and generation of energy and information can be coupled and secured in position thereto.

13. A structure as described in claim 8, wherein said structure is disposed in sunsynchronous low earth orbit.

14. An enclosed self-stabilizing space structure for supporting equipment for transmission, reception, and generation of energy and information, said structure closed upon itself in the form of a loop or belt, encircling a naturally formed mass, other than a stellar body, such as an asteroid or large astronomical body, rotating in space in an orbit where the centrifugal forces are substantially counter-balanced by the gravitational forces.

15. The space structure set forth in claim 14, in which said structure is essentially circular in planform and which rotates exactly at the rate necessary for maintenance of a circular orbit at its distance from said gravitational sources.

16. The space structure set forth in claim 15, wherein said natural orbit is artifically extended by providing radial extension to said structure.

17. A structure in space elongated and closed upon itself in the form of a loop or belt, encircling the earth where its rotational speed causes said structure to be in self-stabilizing tension in that the centrifugal forces are slightly greater than the gravitational forces, said structure for supporting equipment for transmission, reception and generation of energy and information.

18. The space structure of claim 17, wherein said structure is disposed in synsynchronous low earth orbit.

* * * * *